United States Patent [19]
Diekhans et al.

[11] Patent Number: 5,880,684
[45] Date of Patent: Mar. 9, 1999

[54] OPERATOR DEVICE

[75] Inventors: Norbert Diekhans, Gütersloh, Germany; Denis Mesmer, Bouzonville, France; Helmut Homburg, Harsewinkel, Germany

[73] Assignee: Claas KGaA, Harsewinkel, Germany

[21] Appl. No.: 818,799

[22] Filed: Mar. 14, 1997

[30] Foreign Application Priority Data

May 14, 1996 [DE] Germany ............... 196 19 419.9

[51] Int. Cl.⁶ ............................................. G08C 9/00
[52] U.S. Cl. ................. 341/20; 74/471 XY; 74/495; 364/190
[58] Field of Search ............... 341/20; 74/471 XY, 74/495; 364/188, 190; 345/157, 103

[56] References Cited

U.S. PATENT DOCUMENTS

| | | | |
|---|---|---|---|
| 4,524,348 | 6/1985 | Lefkowitz | 340/706 |
| 5,253,160 | 10/1993 | Lin et al. | 364/188 |
| 5,471,260 | 11/1995 | Luce | 351/205 |

FOREIGN PATENT DOCUMENTS 0 203 662  5/1986  European Pat. Off. .

*Primary Examiner*—Michael Horabik
*Assistant Examiner*—Albert K. Wong
*Attorney, Agent, or Firm*—Michael J. Striker

[57] ABSTRACT

An operator device for controlling control units associated with a pulled working machine and arranged on a pulling working machine, the operator device has a plurality of operator elements, and a multi-function handle having a handle part turnable to several control positions and having a head, an operator field arranged in a region of the head of the handle part and provided with the operator elements for actuation of control functions, and a bus system transmitting control signals of the multi-function handle to at least one of the adjusting units.

37 Claims, 4 Drawing Sheets

OPERATOR DEVICE

BACKGROUND OF THE INVENTION

The present invention relates to an operator device for controlling an adjustment unit associated with a pulled working machine.

In particular, it relates to an operator device arranged on a pulling working machine and having several operator elements.

It is known to provide a pulling working machine with an operator device so that it is possible to provide a control of adjustment units arranged on a pulled working machine. This operator device includes several switches which can assume two switching positions and for example make possible opening and closing of a tale gate of the pulled working machine. The disadvantage of the known operator device is that one operator element is needed for actuation of a control function and, because of the arrangement of the operator elements in one plane, the operator device has a great space consumption. Furthermore, it is known to provide a turnable function handle in a self-propelling harvester. However, with this function handle the speed of predetermined adjustment units arranged on the harvester is adjustable.

The German patent document DE 35 14 438 C1 discloses that for operation of auxiliary devices in motor vehicles, the operator element can be formed as an operator key. These operator key are arranged also in one plane of the operator device and characteristic symbols for a visual determination are associated with the corresponding operator key. In unfavorable light conditions, for example in the event of strong sun radiation or reflection of the upper surface, such symbols are difficult to recognize which can lead to faulty operation.

SUMMARY OF THE INVENTION

Accordingly, it is an object of the present invention to provide an operator device of the above mentioned type, which avoids the disadvantages of the prior art.

More particularly, it is an object of present invention to provide an operator device of the above mentioned general type which guarantees a simpler operation and improve switching of adjustment units arranged on a pulled working machine.

In keeping with these objects and with others which will become apparent hereinafter, one feature of the present invention resides, briefly stated, in an operator device which is formed as a multi-function handle with a handle part turnable to several control positions, with an operator field arranged in the region of a head of the handle part and having a plurality of operator elements for operation of further control functions, and a bus system which transmits the control signals from the multi-function handle to at least one adjusting unit.

The operator device in accordance with the present invention has the advantage that formation of the operator device as a multi-function handle with a gripping part provides for an especially simple operation of the adjusting unit arranged on the pulled working machine. By the actuation of the handle, the control of several adjustment units is possible. Depending on the movement of the handle part to a predetermined control position, an adjustment unit associated with this control position is controllable. With he provision of one bus system, several adjustment units can be controlled by the multi-function handle in a simple manner, in dependence on the turning direction of the handle part, different adjusting units are actuatable.

Preferably, the handle part has two to six control positions. In a first control position, an activating signal is outputted to the associated control unit while in a second control position which is opposite to the first control position, a deactivating signal is outputted to the associated control unit. By actuation of a single handle part, several control positions can be assumed. With the provision of corresponding symbols in the region of the head of the handle part, the control positions are characterized.

In accordance with a further embodiment of the present invention, the control positions for activation and deactivation of a control unit are arranged symmetrically relative to one another. Thereby the operation of the handle part is further simplified. For example for activation of an adjustment unit, the handle part is moved forwardly, and for the deactivation of the adjustment unit the handle part moves rearwardly.

Preferably further operator elements are arranged in the region of the head of the handle part. They are formed ergonomically preferably as operator keys which are actuatable substantially by a singer finger, preferably by a thumb. Furthermore, the flatly formed operator field has indicating elements which generate the warning signal or indicate symbols for recognition of the corresponding operator elements or the control positions.

In accordance with a further embodiment of the invention, the multi-function handle is connected with a microcomputer. Therefore by actuation of an operator key on the operator field, several manual planes are adjustable, in which different control functions are associated with the operator element. Thereby the number of the control functions actuatable by the multi-function handle can be arbitrarily increased.

In accordance with the present invention, the multi-function handle can be connected with an external indicating unit. Therefore, the indicating field can be formed greater. Preferably, this indicating unit can indicate several informations which are not directly connected with the control of the adjustment units by the multi-function handle. Preferably, the indicator unit and the multi-function handle are connected on the one side and the adjustment units are connected on the other side with the microcomputer, so that the expenses for cable connections are substantially reduced.

In accordance with a further embodiment of the invention, after actuation of a predetermined operator key, a manual is selectable, so that the multi-function handle is connected with turning control unit. With actuation of the handle part, the total driver cabin can move about a vertical central axis. Thereby the handle part can be pulled for actuation of different control functions in a simple manner, in dependence on the programming of the microcomputer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

An operator device in accordance with the present invention is used in a pulling working machine such as for example a self-propelling carrier vehicle or a field chopper, in connection with a pulled working machine such as for example a press, silage car or a car loader or another agricultural working implement.

Figure 1:
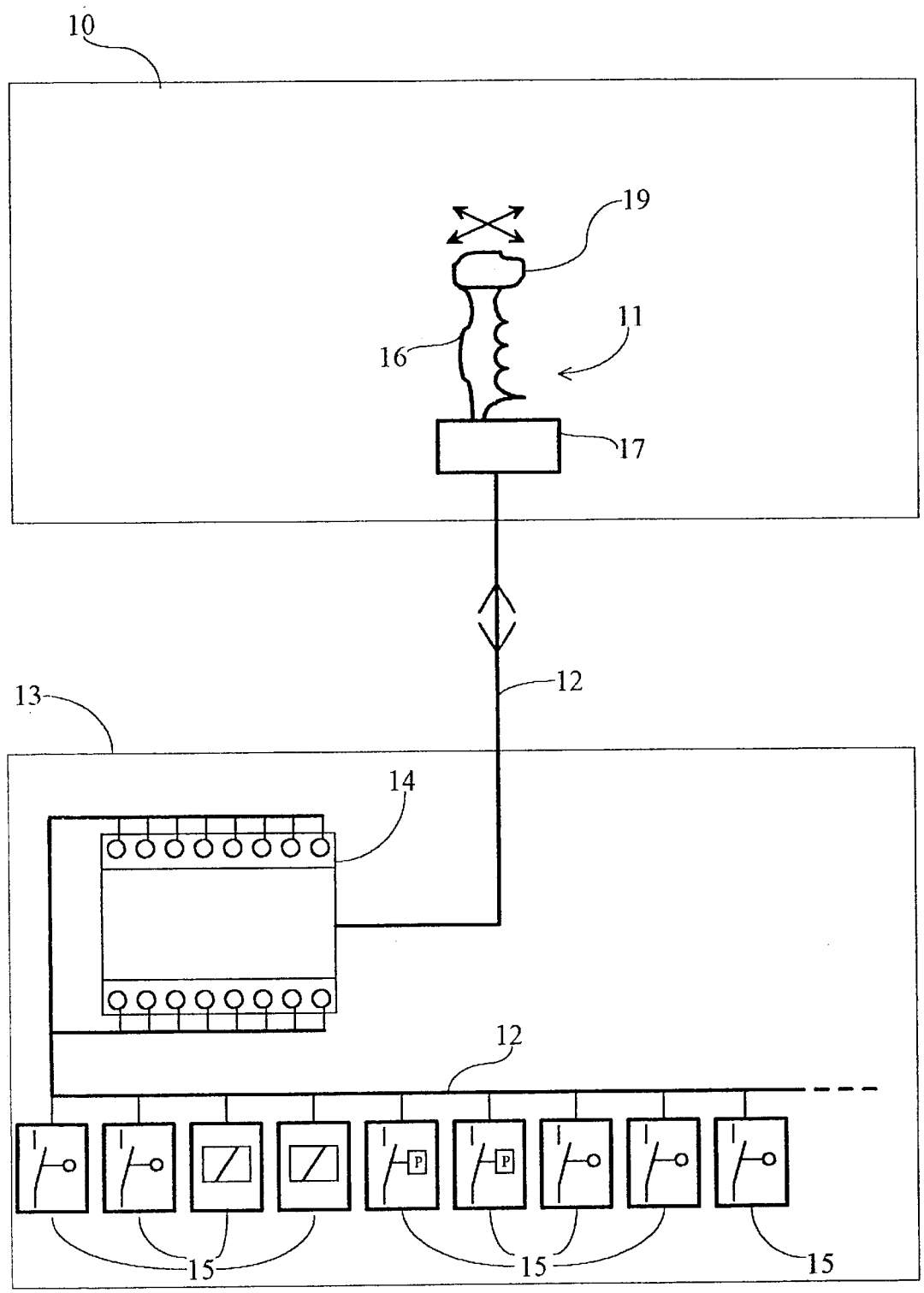
FIG. 1 is a view showing a block diagram of an inventive operator device in accordance with the first embodiment of the invention.

In accordance with a first embodiment of the present invention shown in FIG. 1, a carrier vehicle 10 is provided in its driver cabin with a multi-function handle 11. The multi-function handle is connected through a bus system 12 with a microcomputer 14 arranged on a press 13. By actuation of the multi-function handle 11 control signals are transmitted to the microcomputer 14, they are processed in the microcomputer, and subsequently transmitted further through the bus system 12 to corresponding adjustment units 15. The adjustment units 15 can be formed as actuaters, adjustment members or sensors.

Figure 3A:
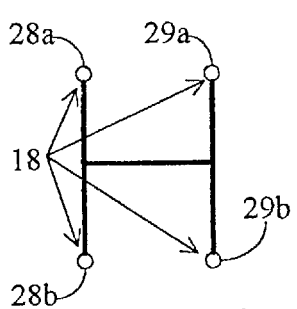
FIG. 3a is a view showing an arrangement of control positions of a handle part of the inventive device in accordance with a first embodiment of the present invention.

The multi-function handle 11 has a handle part 16. The handle part is supported moveably in a carrier housing 17 of the multi-function handle 11 and can assume several control positions 18 shown in FIGS. 3a and 3b. The carrier housing 17 has a microcontroller and a CAN interface. Therefore, the corresponding control signals, in dependence on the control positions 18 of the handle part 16 can be transmitted through the bus system 12 to the microcomputer 14. The bus system can be formed for example as a CAN bus.

Figure 2A:
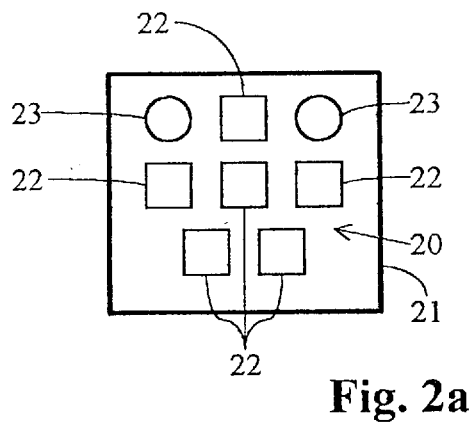
FIG. 2 is a plan view on an operator field in accordance with the first embodiment of the present invention.
FIG. 2b is a plan view on an operator field in accordance with a second embodiment of the present invention.

In the region of the head 19 of the handle part, the multi-function handle 11 has operator elements 20 with which further control functions of the press 13 can be actuated. The operator elements 20 can be arranged for example laterally on the head 19 of the handle part. In accordance with a preferred embodiment, the head 19 of the handle part has a flat operator field 21 which is substantially horizontal or is arranged under an acute angle relative to a horizontal plane. In accordance with a first embodiment of the operator field 21 shown in FIG. 2a, the operator elements 20 are formed as operator keys 22. Two indicating elements 23 are arranged in the upper region of the operator field 21. On the one hand, they can be formed as warming lights and/or directly indicate the control functions actuated by the operator.

Figure 2B:
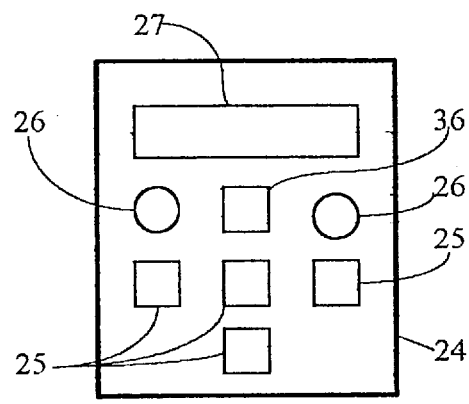

In accordance with a second embodiment shown in FIG. 2b, an operator field 24 has operator keys 25 arranged in a cross-shape pattern. In the upper region of the operator field 24, two control lights 26 are arranged. They can identify for example the operational readiness of the press or the end of the binding yarn supply. Adjacent to it, an indicating unit 27 extending over the width of the operator field 24 is arranged. It is formed as a liquid crystal indicator and represents symbols or words which are connected with the respective control process, or provide information as to what is indicated by the illumination of the control lights 26.

The handling of the multi-function handle 11 is described herein below. By actuation of the handle part 16, four control positions 18 shown in FIG. 3a can be adjusted. For insuring a comfortable operation, these control positions 18 are arranged relative to frequently performed control functions of the baling press 13. In accordance with a first control position 28a the control function "Tail Gate open" and in accordance with an opposite control position 28b, the control function "Tail Gate closed" are identified. By moving the handle parts 16 to the control position 29a, the "Pick Up lower" and to the opposite position 29b the "Pick Up lifted" are identified. Further control functions which are not frequently utilized, such as for example the control function "Thread operation" actuated by the operator key 25 on the head 19 of the handle part.

Figure 4:
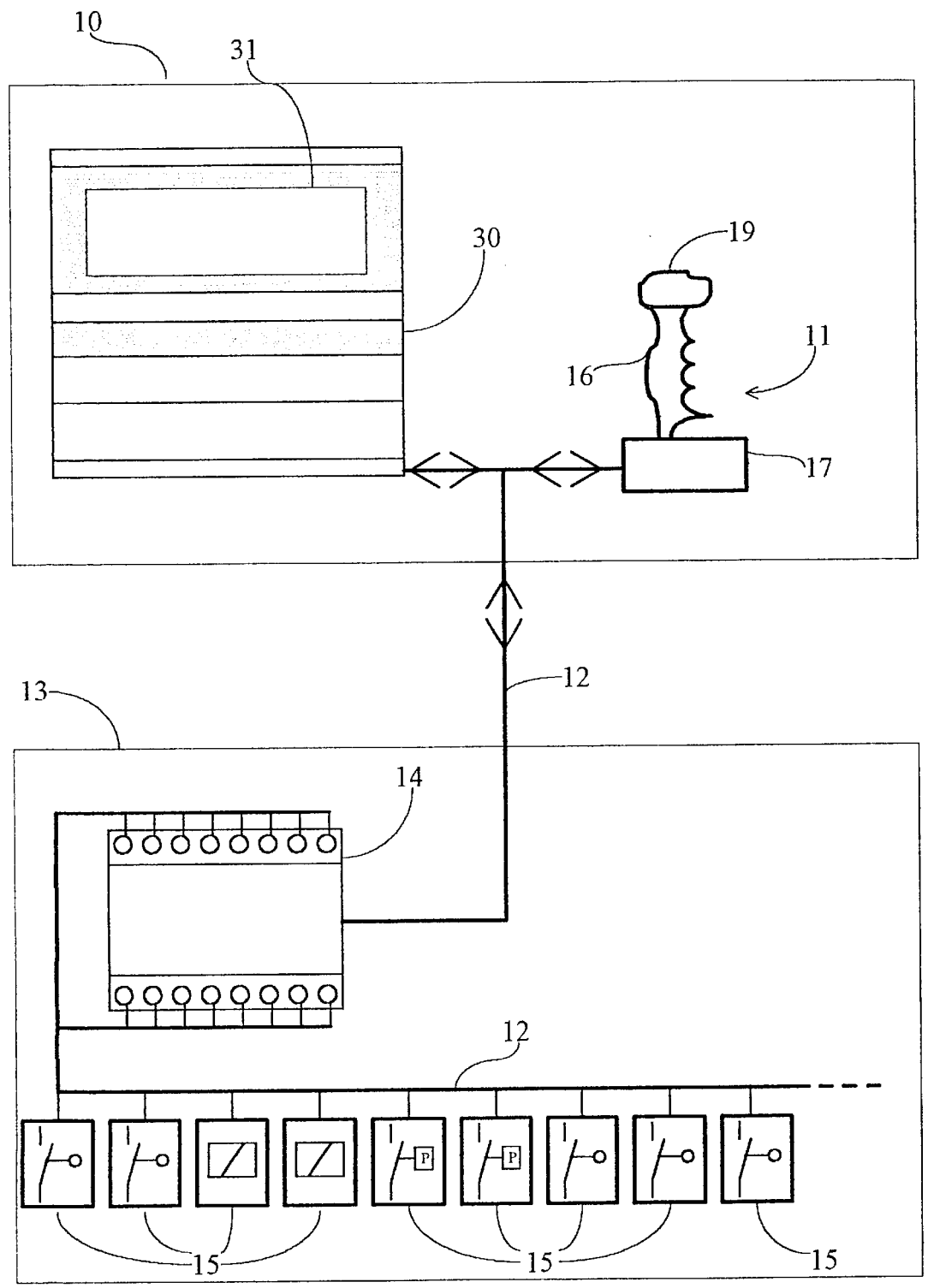
FIG. 4 is a view showing a block diagram of the operator device in accordance with a second embodiment of the present invention.

In accordance with a second embodiment of the invention shown in FIG. 4, the multi-function handle 11 is connected with an indicating device 30. The indicating device 30 provide both the possibility of representing the control functions actuated by the multi-function handle 11 in a greater and easily readable indicating field 31. Also, the informations outputted by the computer 14 can be indicated by the indicating process. For example, it can be indicated in words that the tail is closed or open, the building process is finished, or the yarn supply is depleted.

Figure 3B:
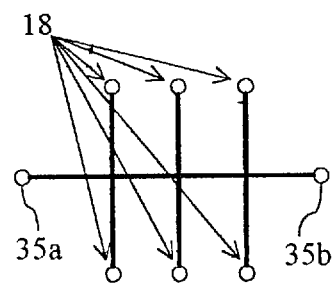
FIG. 3b is a view showing an arrangement of control positions of a handle part of the inventive device in accordance with a second embodiment of the present invention.
Figure 5:
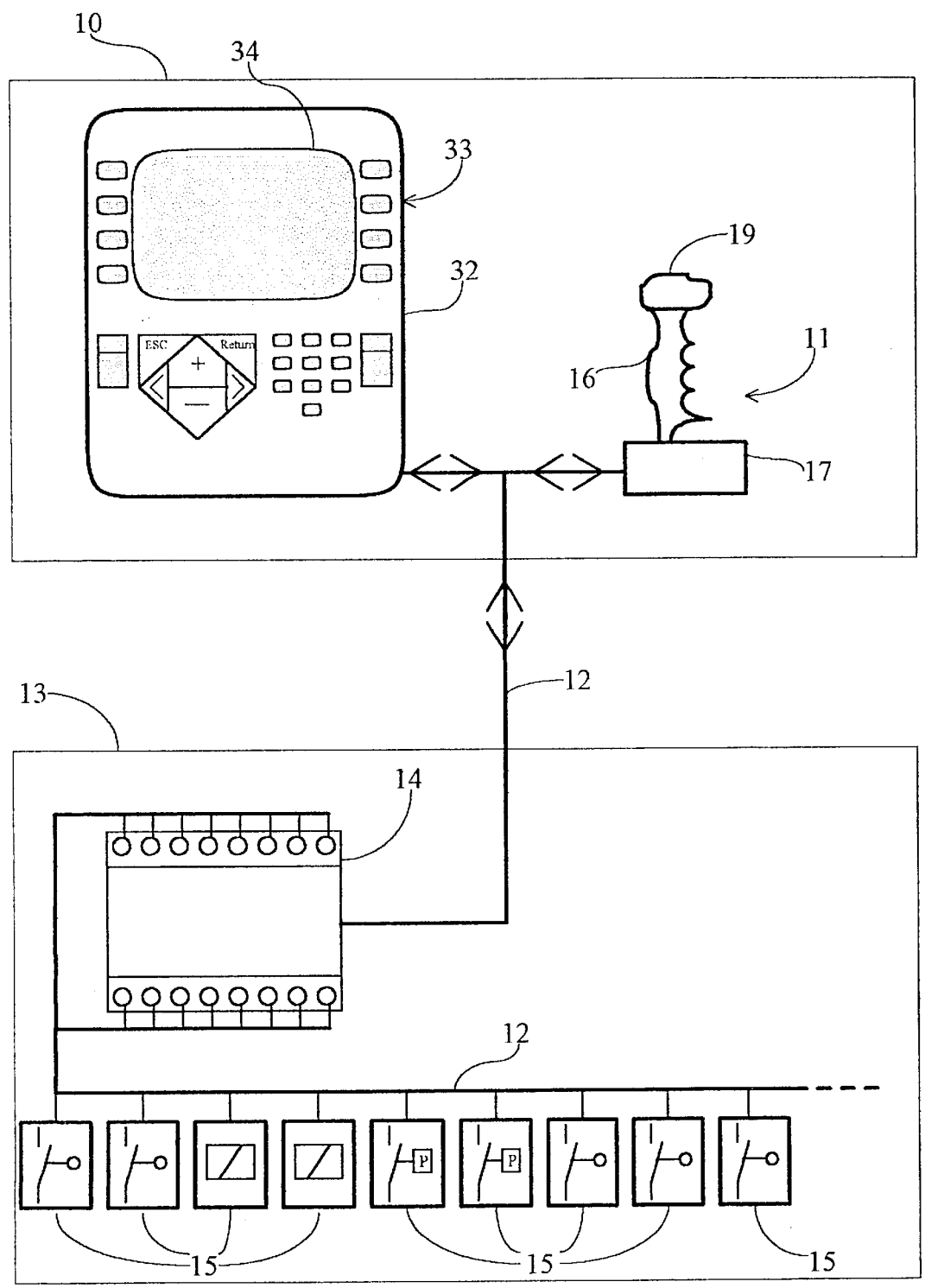
FIG. 5 is a view showing a block diagram of the operator device in accordance with a third embodiment of the present invention.

In accordance with a further embodiment of the invention shown in FIG. 5, the multi-function handle 11 is connected on the carrier vehicle 10 with a microcomputer 32 arranged in the carrier vehicle 10. The microcomputer 32 includes on the one hand operator keys 33 for inputting of control-relevant data and on the other hand a greater indicating window 34 which all relevant data for the operator can be represented. In particular, the size of the indicator window 34 is suitable for visualizing the total press 13 with the control-relevant adjustments 15. This embodiment provides for a simple and convenient operation of the pulled working machine. Alternatively, the multi-function handle 11 can be used for activating the adjustment units arranged in the carrier vehicle 10. If the carrier vehicle 10 has for example a not shown turning control unit which makes possible a turning of the driver cabin about a vertical longitudinal axis of the carrier vehicle 10, the control position 35a can cause a turning movement to the left and the control position 35b can cause a turning movement to the right as shown in FIG. 3b.

In accordance with a further embodiment, an operator key 22 of the operator field 21 can be formed as a manual key 36, when the number of the operator keys 22 on the one hand and the number of the control positions 18 of the handle part 16 on the other hand is not sufficient. For example, for controlling a car loader it is needed to perform further control functions. By means of the manual operator key 36 several manual planes are adjustable. In the first manual plane, the already illustrated frequently occurring control functions are operatable, and in a further manual plane the control functions "Bending Shaft lifted" and "Bending Shaft lowered", "Cutting Trough open" and "Cutting Trough close" as well as turning on and turning off of the transverse conveyor band are provided.

Moreover, it is possible by simultaneous actuation of the operator key 22 to steplessly adjust the scrapper ground speed of the car loader. The scrapper ground speed can be indicated by the indicating field 31 and the indicating window 34. In accordance with a further embodiment, the carrier vehicle 10 and the press 13 have a transmitting unit and a receiving unit for wirelessly performing an alternating-side communication between the carrier vehicle 10 and the press 13. This is performed because of the spacial closeness from the carrier vehicle 10 and the press 13 by transmitting radio waves in a high frequency region. Alternatively, also infrared waves and microwaves are suitable for this purpose, to transmit the desired control signals or information data. The wireless transmission by radio waves can be performed in a simple manner by mounting a radio adapter card with a radio module in the microcomputer. Moreover, the transmission can be also performed by light waves. The control signals are transmitted in a not shown coding unit of the multi-function handle 11 as pulse-coded or pulse-code-modulated signals to the microcomputer. A decoding unit associated with it decodes the control signals and supplies the control signals, for example through the agricultural bus system 12, to the corresponding units 15.

For moving back the handle part 16 always to a zero position, the handle part 16 is arranged under a pretensioning. The pretensioning provides an automatic return of the handle part 16 after it is released by the operator.

Alternatively, the operator device can be also arranged on a self-propelling harvester, and the associated control units are actuatable from the operator device.

It will be understood that each of the elements described above, or two or more together, may also find a useful application in other types of constructions differing from the types described above.

While the invention has been illustrated and described as embodied in operator device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An operator device for controlling adjusting units associated with a pulled working machine and arranged on a pulling working machine, the operator device comprising a plurality of operator elements; and a single multi-function handle arranged on the pulling working machine and having a handle part turnable to several control positions and provided with a head; an operator field arranged in a region of said head of said handle part and provided with said operator elements for actuation of control functions; and a bus system transmitting control signals of said single multifunctional handle arranged on the pulling working machine to at least one of the adjusting units of the pulled working machine.

2. An operator device as defined in claim 1, wherein said control positions are arranged so that during movement of said handle part to a first control position the adjusting unit receives an activating signal, and during movement of said handle part to a control position which is opposite to said first mentioned control position a deactivating signal is provided which removes the activating signal.

3. An operator device as defined in claim 2, wherein said control positions for providing an activating signal and said control positions for providing a deactivating signal are arranged opposite to one another.

4. An operator device as defined in claim 2, wherein said control positions for providing an activating signal and said control positions for providing a deactivating signal are arranged symmetrically to one another.

5. An operator device as defined in claim 2, wherein said control positions for providing an activating singal and said control positions for providing a deactivating signal are arranged opposite to and symmetrically relative to one another.

6. An operator device as defined in claim 1, wherein said operator elements are formed as operator keys responsive to pressure.

7. An operator device as defined in claim 1, wherein said operator field is provided with indicating elements for indicating of switching conditions of the adjusting unit produced by an actuation of said handle part.

8. An operator device as defined in claim 1, wherein said operator field is provided with indicating elements for indicating of switching conditions of the adjusting unit produced by an actuation of said operator element.

9. An operator device as defined in claim 1, wherein said operator field has indicating elements for indicating warning signals.

10. An operator device as defined in claim 7, wherein said indicating elements also provide indicating of warning signals.

11. An operator device as defined in claim 1, wherein said operator field has at least one indicating unit for indicating symbols which characterize control functions actuated by said handle part.

12. An operator device as defined in claim 1, wherein said operator field has at least one indicating unit for indicating symbols which characterize control functions actuated by said operator elements.

13. An operator device as defined in claim 11, wherein said operator field also has at least one indicating unit for indicating symbols which characterize control functions actuated by said operator elements.

14. An operator device as defined in claim 1; and further comprising a microcomputer connected with said multi-function handle, said operator field having a first operator key formed as an manual operator key so that by actuation of said manual operator key several manual planes are adjustable, and so that, in dependence on the adjusted manual plane, different control functions are identified for each operator element.

15. An operator device as defined in claim 1; and further comprising a microcomputer connected with said multi-function handle, said operator field having a first operator key formed as an manual operator key so that by actuation of said manual operator key several manual planes are adjustable, and so that, in dependence on the adjusted manual plane, different control functions are identified for the control positions of said handle part.

16. An operator device as defined in claim 14, wherein in dependence on the adjusted manual plane, different control functions for the control positions of said handle part are also defined.

17. An operator device as defined in claim 1, wherein said operator field has a manual operator key for adjusting several manual planes and also further operator keys spaced from said manual operator key; and further comprising indicating elements for visual representation of respective one of said manual planes.

18. An operator device as defined in claim 17, wherein said indicating means include liquid crystal indicating elements which form an indicating unit.

19. An operator device as defined in claim 1; and further comprising a microcomputer; a CAN bus which forms a bus system and connects said multifunction handle with said microcomputer; and a further bus system through which the control units are controllable from said microcomputer.

20. An operator device as defined in claim 19, wherein said further bus system is formed as an LBS bus.

21. An operator device as defined in claim 1; and further comprising a microcomputer; and a transmitting unit and a receiving unit associated with said multi-function handle and said microcomputer correspondingly for a wireless transmission of control signals.

22. An operator device as defined in claim 21, wherein said transmitting unit and said receiving unit are formed so that the control signals are transmitted between the pulling working machine and the pulled working machine.

23. An operator device as defined in claim 22, wherein said transmitting unit and receiving unit are formed so that the control signals are transmitted by radio waves.

24. An operator device as defined in claim 22, wherein said transmitting unit and receiving unit are formed so that the control signals are transmitted by infrared waves.

25. An operator device as defined in claim 23, wherein said transmitting unit and receiving unit are formed so that the control signals are transmitted by microwaves.

26. An operator device as defined in claim 22, wherein said transmitting unit and said receiving unit are formed so that the control signals are transmitted as light waves in a light wave conductor between the pulling working machine and the pulled working machine.

27. An operator device as defined in claim 1; and further comprising an external indicating unit associated with said multi-function handle and arrangeable inside the pulling working machine for indicating of large-surface symbols.

28. An operator device as defined in claim 1; and further comprising an external indicating unit associated with said multi-function handle and arrangeable inside the pulling working machine for indicating of large-surface words.

29. An operator device as defined in claim 1; and further comprising an external indicating unit associated with said multi-function handle and arrangeable inside the pulling working machine for indicating of large-surface symbols and words.

30. An operator device as defined in claim 1; and further comprising a microcomputer associated with said multi-function handle and arranged in the pulling working machine; and an indicating device integrated in said microcomputer for indicating control functions, for indicating a manual plane, and for indicating further information describing a control.

31. An operator device as defined in claim 30, wherein said multi-function handle and said microprocessor are provided with a coding unit and a decoding unit to transfer control signals formed as pulse-coded and pulse-code modulated signals between said multi-function handle and said microcomputer.

32. An operator device as defined in claim 1, wherein said handle part is arranged with a pretensioning so that after releasing said handle part by an operator, said handle part is moved from a control position to an initial position.

33. An operator device as defined in claim 1, wherein said multi-function handle is connectable with a turning control unit so that a driver cabin of the working machine is turnable about a vertical central axis of the driver cabin by actuation of said multi-function handle.

34. An operator device as defined in claim 1, wherein said handle part has a longitudinal axis, said operator field being arranged at an acute angle to said longitudinal axis of said handle part.

35. An operator device as defined in claim 1, wherein said multi-function handle is formed so that it controls control units arranged on the pulling working machine.

36. An agricultural machinery system, comprising a pulled working machine provided with adjusting units; a pulling working machine connectable with said pulled working machine and provided with an operator device for controlling said adjusting units of said pulled working machine, said operator device including a single multi-function handle arranged on said pulling working machine and including a handle part turnable to several control positions, a head, an operator field arranged in a region of said head and provided with operator elements for actuation of control functions, said operator device further including a bus system transmitting control signals of said single multi-function handle of said pulling working machine to at least one of said adjusting units of said pulled working machine.

37. An agricultural machinery system, comprising a pulling working machine; a plurality of pulled working machines selectively connectable with said pulling working machine and provided with adjusting units; and an operator device for controlling said adjusting units of said pulled working machines, said operator device including a single multi-function handle arranged on said pulling working machine and having a handle part turnable to several control positions, a head, an operator field arranged in the region of said head and provided with operator elements for actuation of control functions, said control device further including a bus system transmitting control signals of said single multi-function handle of said pulling machine to at least one of said adjusting units of each of said pulled working machines when a corresponding one of said pulled working machines is connected to said pulling working machine.

* * * * *